No. 864,413. PATENTED AUG. 27, 1907.
E. C. EVERETT.
LENS FASTENING FOR LAMPS.
APPLICATION FILED NOV. 20, 1905.

Witnesses:
R. W. Rimer.
E. A. Volk.

Inventor:
Ernest C. Everett,
by Wilhelm, Parker & Hard,
Attorneys.

UNITED STATES PATENT OFFICE.

ERNEST C. EVERETT, OF NEW YORK, N. Y., ASSIGNOR TO R. E. DIETZ COMPANY, OF NEW YORK, N. Y.

LENS-FASTENING FOR LAMPS.

No. 864,413.　　　Specification of Letters Patent.　　　Patented Aug. 27, 1907.

Application filed November 20, 1905. Serial No. 288,194.

*To all whom it may concern:*

Be it known that I, ERNEST C. EVERETT, a citizen of the United States, residing at New York, in the county of New York and State of New York, have invented a new and useful Improvement in Lens-Fastenings for Lamps, of which the following is a specification.

This invention relates to that class of lamps which are mainly designed for use on vehicles, for instance, automobiles, and which are provided at the front with a lens or bull's eye for concentrating the light, increasing the illumination or rendering the signal effect more pronounced.

The object of this invention is to connect the lens or bull's eye to the surrounding frame in such manner that the lens can be readily attached or removed and can be nicely adjusted, as the position of the flame or other conditions may render desirable.

Figure 1:
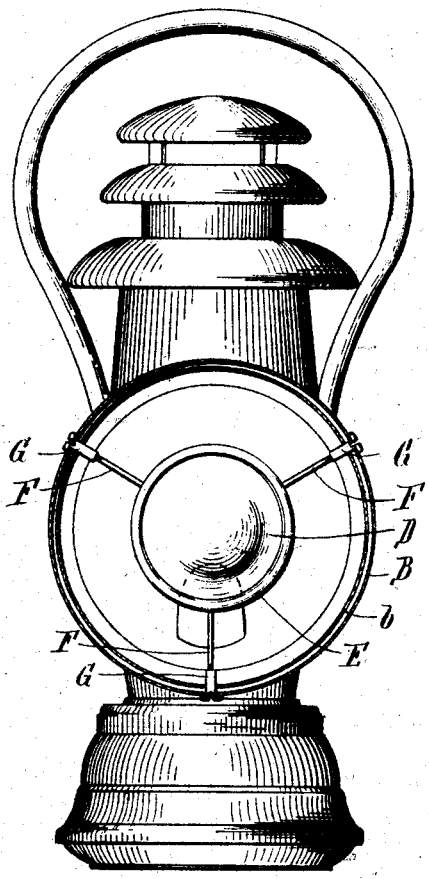
Figure 2:
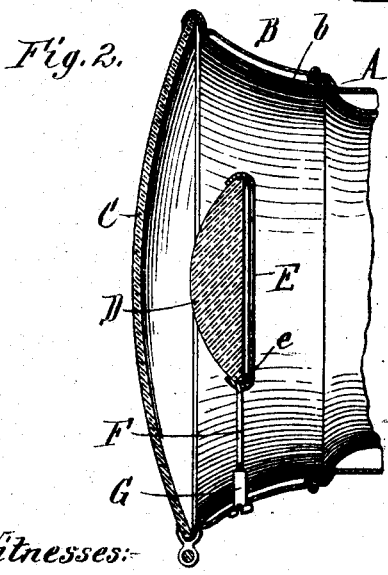
Figure 3:
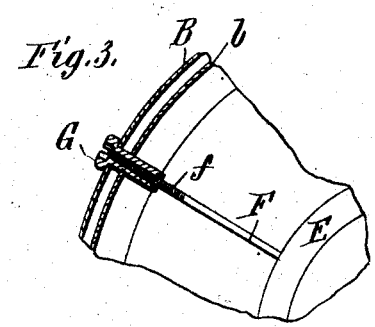

In the accompanying drawings: Figure 1 is a front elevation, partly in section, of a vehicle lamp provided with my improvement. Fig. 2 is a longitudinal section, on an enlarged scale, of the lens or bull's eye and connecting parts. Fig. 3 is a sectional view, on a greatly enlarged scale, of one of the adjustable supporting rods of the lens.

Like letters of reference refer to like parts in the several figures.

A represents the body of a vehicle lamp of any ordinary or suitable construction and B the annular front frame which is movably attached to the body by the usual hinge and catch and which may contain a reflector lining $b$. The frame B is provided with the usual front glass C.

D represents the lens or bull's eye which is arranged centrally within the front frame B in rear of the front glass so as to be approximately in line with the flame. This lens is secured in a circular, metallic frame E, preferably by a wire ring $e$, or other suitable means, so as to be removable.

The lens frame E is secured to the annular front frame B by radial rods F which are secured with their inner ends to the lens frame by soldering or otherwise, and with their outer ends to the front frame B by screw nipples or sleeves G. The latter are threaded internally and engage the outer threaded portions $f$ of the rods. The nipples extend inwardly through openings formed in the front frame B and its lining or reflector $b$ and bear with their heads against the outer side of the frame. By tightening or releasing the nipples the position of the lens can be adjusted as may be necessary to aline it properly with the flame, and by removing the nipples the lens can be detached when not required for use.

I claim as my invention:

1. In a lamp, the combination of a lens, a surrounding supporting frame, supporting rods connected at their inner ends with the lens, and individual fastenings which connect the outer ends of the several rods separately with said frame and which are radially adjustable, thereby enabling the lens to be focused with reference to the flame, substantially as set forth.

2. In a lamp, the combination of a lens, a surrounding supporting frame, supporting rods connected with the lens at their inner ends, and adjustable screw fastenings connecting the outer ends of the rods with said frame, substantially as set forth.

3. In a lamp, the combination of a lens, a surrounding supporting frame provided with openings, supporting rods arranged in line with said openings and connected with the lens at their inner ends, and screw sleeves arranged in said openings and engaging the outer ends of said rods, substantially as set forth.

Witness my hand, this 10th day of November, 1905.

ERNEST C. EVERETT.

Witnesses:
OSCAR WARNER,
A. E. LUERSSEN.